(12) United States Patent
Davis

(10) Patent No.: US 7,369,504 B2
(45) Date of Patent: May 6, 2008

(54) BANDWIDTH MANAGEMENT OF RESILIENT PACKET RING NETWORK

(75) Inventor: Tom Davis, Ottawa (CA)

(73) Assignee: Alcatel Canada, Inc., Ottawa, Ontario (CA)

( * ) Notice: Subject to any disclaimer, the term of this patent is extended or adjusted under 35 U.S.C. 154(b) by 1041 days.

(21) Appl. No.: 10/316,929

(22) Filed: Dec. 12, 2002

(65) Prior Publication Data

US 2004/0114520 A1 Jun. 17, 2004

(51) Int. Cl.
*H04L 12/26* (2006.01)

(52) U.S. Cl. .................... 370/236.1; 370/235

(58) Field of Classification Search ............ None
See application file for complete search history.

(56) References Cited

U.S. PATENT DOCUMENTS

| | | | |
|---|---|---|---|
| 6,385,168 B1 | 5/2002 | Davis et al. | 370/230 |
| 2005/0100031 A1* | 5/2005 | Choe et al. | 370/404 |

* cited by examiner

*Primary Examiner*—Edan Orgad
*Assistant Examiner*—Blanche Wong
(74) *Attorney, Agent, or Firm*—Jim Zegeer

(57) ABSTRACT

Techniques for bandwidth management and flow control on a resilient packet ring (RPR) network is described. The RPR requires allocation and guarantee of a bandwidth for each channel between two nodes on the ring. The bandwidth is managed by shaping traffic on a channel at the source by using a bandwidth allocation factor calculated at each node. The bandwidth allocation factor, which is communicated to other nodes, is calculated by using a recursive nonlinear function of the transit buffer size.

20 Claims, 6 Drawing Sheets

BANDWIDTH MANAGEMENT OF RESILIENT PACKET RING NETWORK

FIELD OF INVENTION

The invention relates generally to the bandwidth management of telecommunications network. In particular, it is directed to the bandwidth management by way of flow control of packet data traffic in a telecommunications network in the dual ring topology.

BACKGROUND OF INVENTION

A variety of network architectures are available for designing and implementing a telecommunications network. The ring topology is found very frequently in network architectures. The dual ring topology, in particular, offers numerous advantages over a single ring topology, such as reliability and bandwidth flexibility to name a few. A telecommunications network in the dual ring topology uses two physically separated rings, one for each traffic direction, clockwise (CW) and counter-clockwise (CCW).

A new IEEE protocol is in the process of being defined (802.17) for a flexible and resilient dual ring topology which is called Resilient Packet Ring (RPR for short). RPR is a MAC layer protocol dedicated to dual ring architectures but it is a "plug and play" design without a software based station management transfer (SMT) protocol or ring master negotiation as seen in other ring based MAC protocols. RPR provides a scalable LAN/MAN/RAN/WAN architecture with shared access method, spatial reuse, and resiliency through fault protection method. Among many other features, RPR supports multiple classes of services; e.g., low-delay guaranteed rate, bounded delay committed rate, and best effort service classes. It also proposes an efficient use of bandwidth by ring capacity reuse downstream of unicast destination (called spatial reuse or reclamation). By spatial reuse, the destination station strips packets addressed to it, thus allowing reclamation of unused committed capacity further downstream. RPR also provides flow control per service class to regulate traffic introduced by clients and point-of-congestion aware flow control (allowing per destination queuing in client). Furthermore it performs weighted fairness access among stations using the ring, i.e., each station is assigned a proportion of the ring's available bandwidth.

The dual rings are made up of clockwise and counter-clockwise ringlets as shown in FIG. 1. As an example, four stations, A, B, C and D (also called nodes) are connected in the dual ring configuration. The RPR protocol operates by sending data traffic in one direction (known as "downstream") on one ringlet (one of the two rings) and its corresponding control information in the opposite direction (known as "upstream") on the opposite ringlet. The stations are able to send data on either ringlet. Generally the shorter of the two possible paths to a given destination is used, based on the node discovery scheme, but this is not required, due for instance to congestion or malfunction on one of the links. Referring to FIG. 1, node A has an ingress ring attachment 10 and an egress ring attachment 12 on each ringlet. Traffic arriving on ingress is destined to transit the node via egress ring attachment 12, or is dropped off the ring at link 14. Traffic is inserted (or added) on the ring via link 16.

Bandwidth management features are important aspects of the RPR protocol. In RPR systems, nodes cooperate to maximize traffic on the rings. They advertise information about current loads so that other nodes may determine how much traffic they can send through that node. Furthermore, since the ring is a shared media, some sort of access control is necessary to ensure fairness and to bound latency. Access control can be broken into two types which can operate in tandem:

Global access control—controls access so that everyone gets a fair share of the global bandwidth of the ring.

Local access control (spatial reuse)—grants additional access beyond that allocated globally to take advantage of segments of the ring that are less than fully utilized.

FIG. 2 includes six nodes in a ring and shows an example of a case where both global and local accesses are required. In the figure, node B is sending data to node C as shown by 20 while node A is sending data to node D, as shown by 22. The both connections share the bandwidth on the span between nodes B and C. Meanwhile node E is sending data to node F as shown by 24. In this case, nodes A and B are given ½ of the bandwidth each. Node E, however, will also get a fair share of ½ of the bandwidth on a global allocation basis. But from a local perspective, node E should be able to get all of the bandwidth since its bandwidth does not interfere with the fair shares of nodes A and B. The spatial reuse will ensure that all the unicast traffic will be stripped at its destination, freeing the bandwidth for reclamation by nodes downstream.

In the RPR networks, a ring channel is defined to be a logical path from a given source node on the ring to a given destination node on the ring, where the source and destination nodes are not necessarily adjacent. A given channel between two nodes on the ring uses a single ring. For sake of description, we describe the flow control algorithm assuming that all channels use the clockwise ring.

The RPR protocol requires that the system should be able to allocate and guarantee bandwidth to each channel on the ring. Furthermore, it has been proposed to provide lossless delivery of traffic over a channel so as to avoid complex traffic management functions in the ring MAC layers where the transit buffer is located.

The prior art is described within presentations to the IEEE 802.17 working group. Conexant proposes a solution which is illustrated in FIG. 3. The traffic flow and queuing architecture is described on node A shown in FIG. 1. The proposed solution describes a flow control mechanism whereby at each node the rate of the insert (or add) traffic, which is transmitted into the ring, is measured. The rate of the insert traffic is communicated in a flow control message to the other nodes in the ring if the transit buffer 30 on the node is congested. The service of each add queue 32 is limited by the shaper 34 to be equal to the minimum insert rate of all congested nodes on the ring. The result is that each node on the ring is permitted to insert an equal amount of traffic into the ring.

The Conexant solution is inadequate for two reasons. First, it requires that every node receive an equal share of the available ring bandwidth at the most congested point in the network. Second, and most importantly, the solution is blocking in that traffic which does not traverse the most congested point in the network, is blocked from entering the network potentially unnecessarily.

Lantern Communications proposes a flow control algorithm which is illustrated in FIG. 4. The Lantern solution defines a weight for each channel (i.e. source to destination flow) that traverses the node. Therefore, there is a separate add queue 40 for each flow (also called channel). A queue for a flow from node A to node B, a queue for a flow from node A to node C and so on. These queues may be virtual queues, i.e., a partitioned storage medium. The algorithm then calculates the shaping rate, fi, for each flow according to the following formula.

$$fi = ri + \frac{wi}{\sum_{active} wi} \times \left(C - \sum_{active} ri\right),$$

where wi is the weight for flow i, flow i transiting the node, and ri is the reserved (i.e. minimum) rate. C is the capacity of the egress link. Shaper 42 enforces the shaping rate by rate limiting weighted fair queue. The equation can be described by describing each of the three terms. The first term is the reserved rate and so the shaping rate cannot drop below the reserved rate. The third term is the available bandwidth at the node. It is equal to any unreserved bandwidth plus the bandwidth reserved but not being used by inactive flows. The second term represents the weighted share of the bandwidth that can be used by the flow.

The Lantern solution achieves this flow control by extracting the terms in the equation which are known locally to the node which generates the flow control message. That is, it defines the term, bandwidth allocation factor (BAF), by $$BAF = \frac{C - \sum_{active} ri}{\sum_{active} wi},$$

and propagates the BAF term to each node in the ring. Each node collects the BAF terms from all other nodes on the network, and then calculates the shaping rate for a given flow using the minimum BAF from all nodes which the flow transits, as follows:

$$fm = rm + wm \times \min(BAFj),$$

where the index, m, pertains to the flows which originate at the local node, and the index, j, pertains to the nodes which are traversed by flow, m and BAFj is the BAF for the egress ring link of node j. The Lantern solution is inadequate for two reasons. First, the equation which calculates the available bandwidth sums the reserved rates of all active channels. However, simply because a channel is active, it does not mean that it is utilizing its full reserved rate. It may be using less. The Lantern solution does not take this into account. Second, the equation that calculates the available bandwidth does not take into account whether a flow which is allocated its fair share of the available bandwidth actually uses all of it. Any available bandwidth which is unused by the flow can be redistributed to other flows. As a result of these two problems, the Lantern solution results in underutilization of the network.

AuroraNetics proposes to improve upon the Conexant solution by assigning a weight to each node in the ring. In this case, the rate at which a node can insert traffic to a ring is given by $$f = \frac{w}{wc} \times \text{rate},$$

where w is the weight of the node for which we are calculating f, and wc is the weight of the congested node. The term, rate, is the rate of "add" traffic at the congested node.

The AuroraNetics solution is inadequate because it does not solve the blocking problem which is present in the Conexant solution.

The problems with each prior art solution are described in the preceding section. In summary, none of the prior art solutions provide full network utilization under all traffic scenarios.

The inventor realized that the RPR flow control problem is similar to the ATM ABR flow control problem and the ABR flow control algorithms can be used in the RPR application.

U.S. Pat. No. 6,385,168 May 7, 2002 Davis et al describes in detail the flow control problem and proposed solutions for the ABR service of ATM network. In the ATM, there are a several classes of service categories, some being committed rate services and others being available rate services. Available Bit Rate (ABR) service is one of the available rate services. The flow control of ABR is achieved by the source sending special resource management (RM) cells through the network. Each switch in the network indicates its congestion status by optionally writing into the RM cell and forwarding the cell into the next switch in the data path. Finally, the destination turns the RM cell back towards the source and the switches in the backward data path mark congestion information into the RM cell which is ultimately received by the source. The source then adjusts its sending rate in response to the information contained in the RM cell. Referring to FIG. 5, ABR queue 50 represent the aggregate count of all ABR cells queued. QD indicates the total queue depth utilized by all ABR connections. Line T is a configurable threshold which represents a pre-selected target for the queue depth. The output cell flow contains both high (committed) priority and ABR traffic. Periodically the ABR queue generates the function g(QD, T) and passes the result to the ER Algorithm 52. The ER Algorithm calculates the offered bandwidth, OBW(k), k being iterated measurements, according to the formula;

$$OBW(k) = g(QD, T) * OBW(k-1),$$

where g(QD, T) is given in one embodiment by either:

$$g(QD, T) = 1 - x \quad \text{if } QD > T \text{ or}$$
$$= 1 + x \quad \text{if } QD <= T.$$

The parameter T is a configurable threshold, and x is a small real number in the range of [0,1]. The function g(QD, T) is only dependent on global queue congestion and threshold. In an alternative embodiment, g(QD, T1, T2) could take a form of:

$$g(QD, T1, T2) = 1 - x \quad \text{if } QD > T1$$
$$= 1 \quad \text{if } T1 >= QD > T2$$
$$= 1 + x \quad \text{if } QD <= T2$$

where T1 and T2 are configurable thresholds and x is a small real number in the range of [0,1]. This second form employs a dead band in which the offered bandwidth is neither increased or decreased. In general terms the number of bands in the queue depth may be increased such that the update to OBW(k) may assume an arbitrary function in the variable.

An applicant's pending application Ser. No. 09/295,821 filed on Apr. 21, 1999, entitled "Method and Apparatus for Providing Data Flow Control of a Transmission Port" describes yet another alternative for calculating a generic OBW for ABR traffic. In the pending application, generic OBW(k) is given by:

$$OBW(k)=OBW(k-1)*\zeta, \text{ where } \zeta=1+\kappa\Delta Q,$$

where $\zeta$ represents the OBW correctional variable, $\Delta Q$ represents a difference term derived from an input data rate and an output data rate of a transmission port and $\kappa$ is a constant. A specific OBW(k) for each connection, i, supported by the node is obtained as follows:

$$OBWi(k)=(OBW(k)/\# \text{ of connections})*\text{weighting factor},$$

The weighting factor prioritizes the connections based on system rules user options, etc.

As mentioned earlier, these algorithms have been designed for flow control of the ABR traffic in the ATM systems. The present inventor realized that these algorithms can be applied equally to ring network, particularly RPR systems in which available bandwidth is distributed among the nodes on the ring under the principles of weighted fair queue and spatial reuse of the bandwidth.

SUMMARY OF INVENTION

Briefly stated, the invention is directed to a technique of bandwidth management in a dual ring packet network, in which a bandwidth can be fairly allocated and guaranteed to a channel between a pair of nodes.

In accordance with a further aspect, the invention guarantees that each link on the ring is fully utilized and the bandwidth on each link is allocated between channels in a weighted fair manner.

The invention, according to another aspect, uses a bandwidth allocation factor for shaping a channel at the source node. The bandwidth allocation factor is the minimum of those factors calculated at all transit nodes of the channel.

In another aspect, the invention uses a recursive nonlinear function of the size of the transit buffer at a node to generate a bandwidth allocation factor for the node.

In a more specific aspect, the invention resides in a packet ring telecommunications network having a plurality of nodes located on a ring in which a bandwidth of the ring is shared among channels between any of two nodes. The invention is directed to a method of managing the bandwidth of a channel between a source node and a destination node. The method includes steps of computing a bandwidth allocation factor based on the size of a transit buffer of the source node, and collecting bandwidth allocation factors from nodes through which the channel transits. The method further includes steps of calculating a shaping rate using a minimum bandwidth allocation factor among bandwidth allocation factors thus collected, and flow controlling data through said channel at the source by using the shaping rate while ensuring observance of a fair share of an available bandwidth by among more than one channel on the ring.

In a further aspect, the invention is directed to a system for managing the bandwidth of a channel between a source node and a destination node on the ring. The system comprises a transit buffer for queuing traffic to be transmitted out of the source node, the traffic being an aggregate of one or more channels, means for monitoring size of the transit buffer at different measurement times, and means for generating a bandwidth allocation factor by using the sizes of the transit buffer measured at the different times. The system further includes means for collecting bandwidth allocation factors from other nodes through which said channel transits and for deriving a minimum bandwidth allocation factors among those factors thus collected, a controller for generating a shaping factor for said channel based on the minimum bandwidth allocation factor, and a shaper for flow controlling traffic of said channel using the shaping factor.

DETAILED DESCRIPTION OF EMBODIMENTS OF INVENTION

Figure 1:
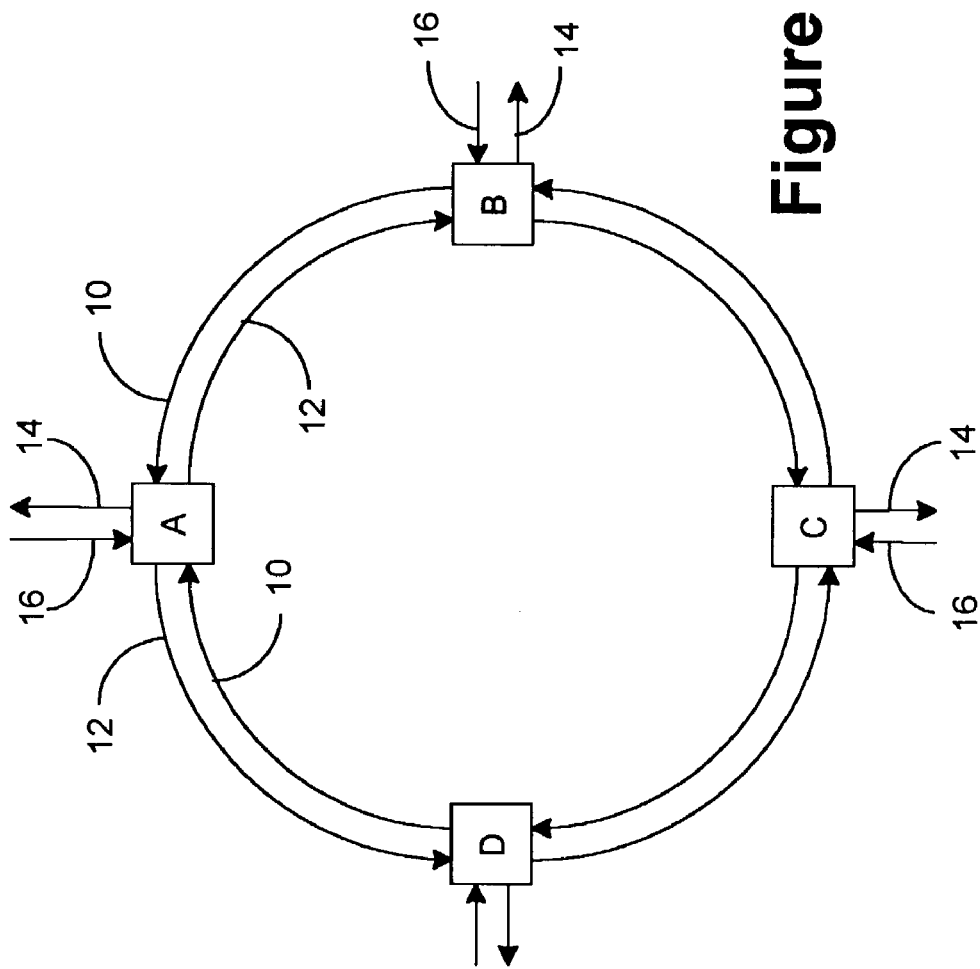
FIG. 1 shows schematically a simplified dual ring network having four nodes.
Figure 2:
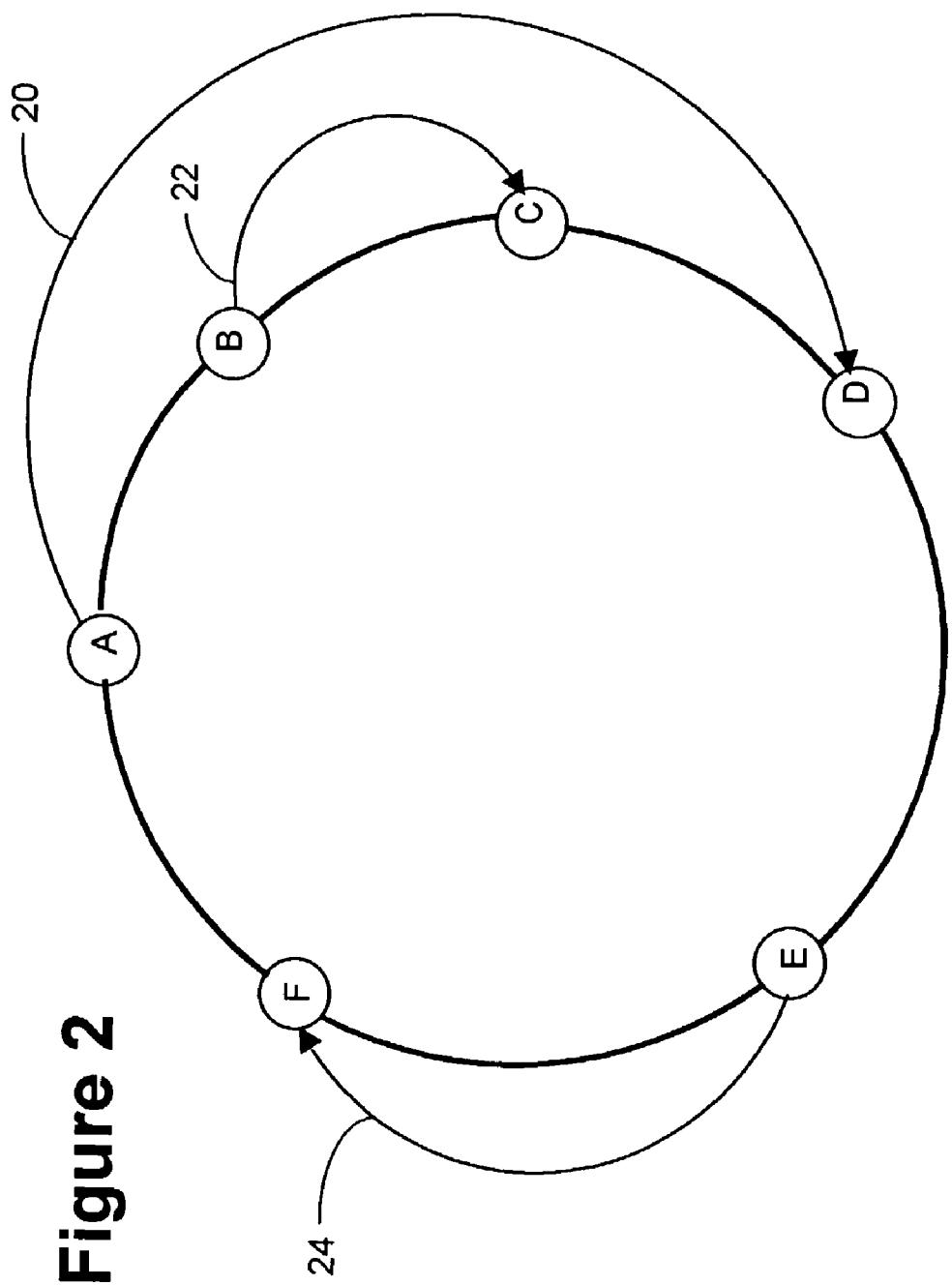
FIG. 2 shows six nodes in a ring network and illustrates an example of a case where both global and local accesses are required.
Figure 3:
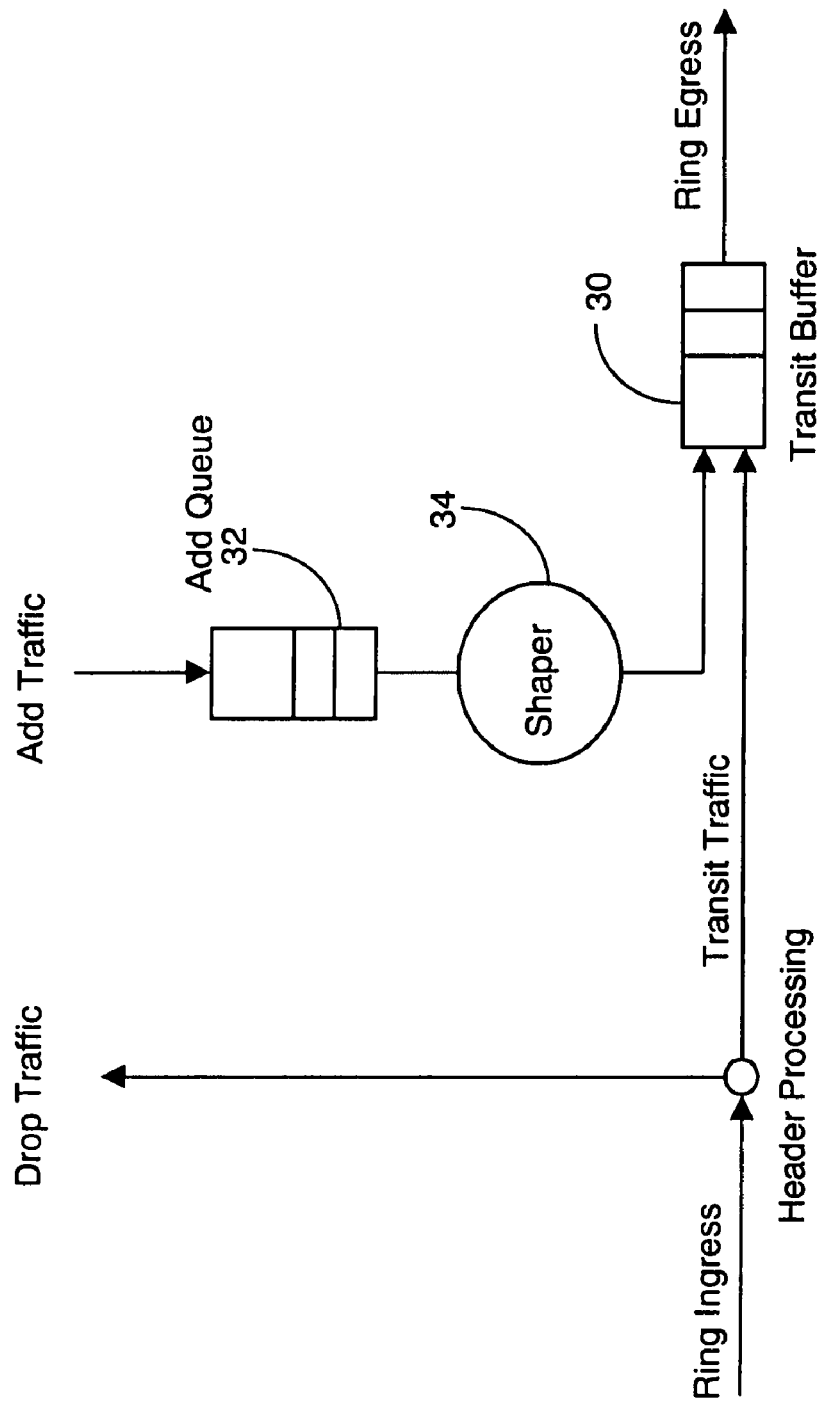
FIG. 3 illustrates schematically a known mechanism of flow control.
Figure 4:
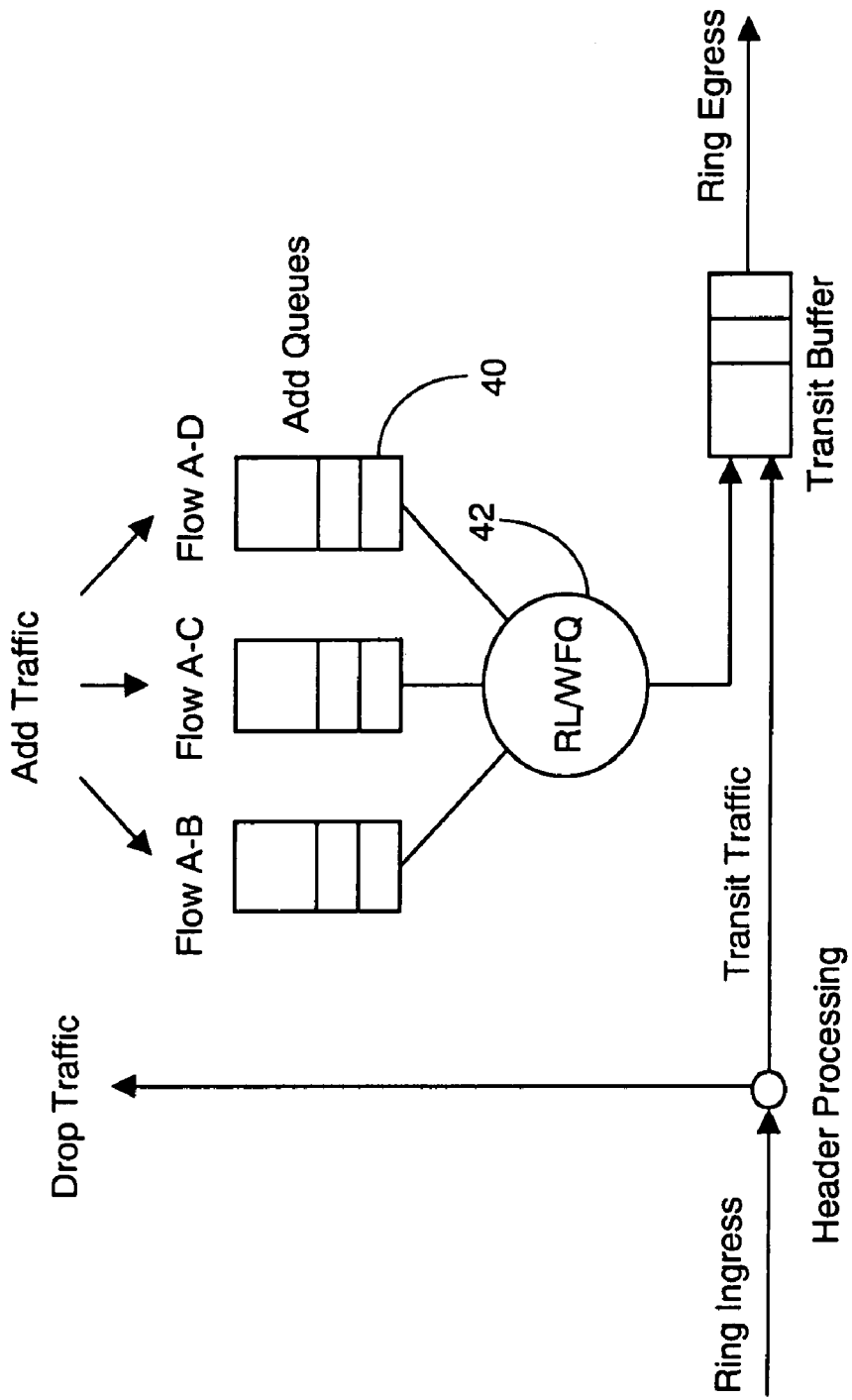
FIG. 4 illustrates schematically another known mechanism of-flow control.
Figure 5:
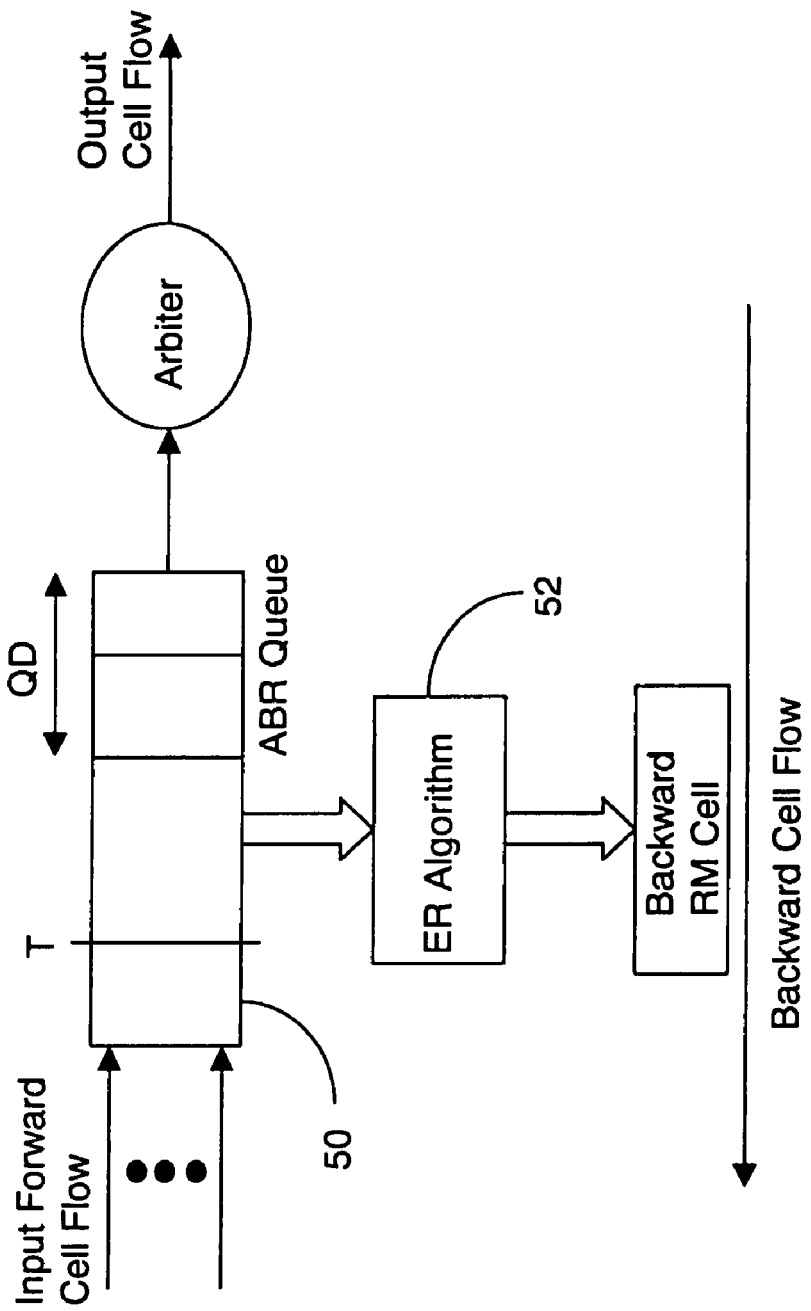
FIG. 5 is a known flow control mechanism designed for handling ABR traffic in an ATM network.
Figure 6:
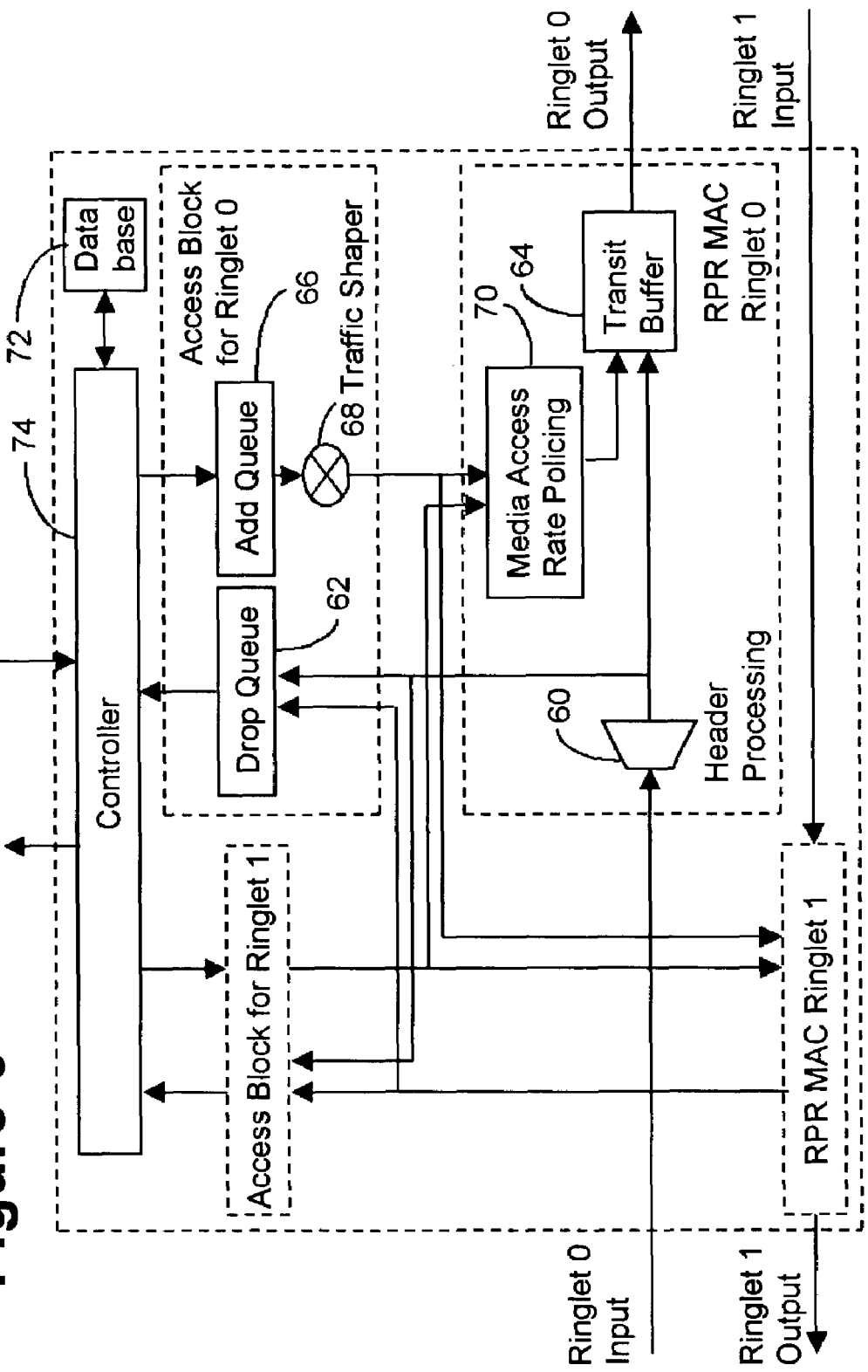
FIG. 6 shows schematically a node on a ring containing features for flow control in accordance with one embodiment of the invention.

FIG. 6 shows schematically one of the nodes in a little more detailed fashion according to one embodiment of the invention. As seen in the figure, the structure of an individual node can be thought of as dual add-drop mux (ADM), one for ringlet 0 (east or clockwise direction) and another for ringlet 1 (west or counter-clockwise direction). In FIG. 6, each ADM is made up of a RPR MAC block and an access block for each ringlet. Traffic is received at ringlet 0 input and after header processing 60 the traffic is sent to either drop queue 62 or transit queue (buffer) 64. Traffic to be added at the node is stored at add queue 66. It should be noted that these add and drop queues are each a plurality of queues for one or more channels (flows). These queues can also be virtual queues for all the active channels. Traffic is shaped at a shaper 68 or a media access rate policing 70 to ensure that each channel being inserted obeys rules and rate imposed on it before it is queued in transit buffer 64 for transmission out of ringlet output 0. Traffic in the opposite direction is handled exactly same fashion. By referring to database 72, controller 74 determines which ringlet traffic is to be passed or inserted. Upon failure of link or station, the controller invokes a protection mechanism in that it decides which ringlet traffic is to be inserted or passed to bypass the failure.

The invention uses the concept of BAF (Bandwidth Allocation Factor) as a flow control parameter for each channel which parameter is communicated to all the nodes on the ring. However, instead of using a weighted share of the available bandwidth as in the Lantern solution mentioned above, one embodiment of the invention calculates a BAF by using a recursive nonlinear function of the size (depth), Q(k), of the transit buffer 64 at the measurement time k, k being the iteration number, as follows:

$$C(k)=C(k-1)*f(Q(k), Q(k-1)),$$

$$BAF=C(k)-1,$$

where k is the iteration number, C(k) is a non-dimensional variable and is a recursive function of the size of transit buffer, and Q(k) is the transit bu-ffer size at the measurement time k. Each node in the ring calculates the shaping rate, fm, for a given channel, m, using the BAF values from all nodes on the ring which that channel transits. That is:

$$fm=rm+wm \times \min(BAFj),$$

where fm is the shaping rate for the channel, m, originating the local node, wm is the weight and rm is the minimum rate of channel, m, BAFj is the BAF for node, j, and min(BAFj) is the minimum BAF value for all nodes, j, which the channel transits. The shaping rate is enforced at each node by the rate limiting weighted fair queue (RL/WFQ), which is a combination of a shaper and queues.

In one embodiment, function f(Q(k), Q(k-1)) represents changes in depth of the transit buffer from a previous measurement (k-1) to the present measurement (k). Therefore, it may be expressed as:

$$f(Q(k), Q(k-1)) = f(Q(k), T) = 1 - x \quad \text{if } Q(k) > T \text{ or}$$
$$= 1 + x \quad \text{if } Q(k) <= T.$$

where the parameter T is a configurable threshold, and x is a small real number in the range of [0,1].

In a further alternative embodiment, f(Q(k), Q(k-1)) could take a form of:

$$f(Q(k), Q(k-1)) = f(Q(k), T1, T2) = 1 - x \quad \text{if } QD > T1$$
$$= 1 \quad \text{if } T1 >= QD > T2$$
$$= 1 + x \quad \text{if } QD <= T2$$

This second form employs a dead band (between T1 and T2) in which the offered bandwidth is neither increased or decreased.

In accordance with a yet another embodiment, f(Q(k), Q(k-1)) can be give by:

$$f(Q(k), Q(k-1))=1+\kappa \Delta Q,$$

where $\Delta Q$ represents a difference term derived from an input data rate at the ingress and an output data rate at the egress of the source node and $\kappa$ is a constant.

In a further embodiment, f(Q(k), Q(k-1)) can also be given by:

$$f(Q(k), Q(k-1))=1+\kappa 1 E - \kappa 2 \Delta Q, \text{ where } E=(T-Q(k-1))$$

where $\kappa 1$ and $\kappa 2$ are constants, E represents an error term and T represents a target queue value. This algorithm will take into consideration of target queue size.

The proposed invention guarantees that each link on the ring is fully utilized and the bandwidth on each link is allocated between channels in a weighted fair manner. It achieves this with a simple traffic management architecture in the transit buffer.

What is claimed is:

1. In a packet ring telecommunications network having a plurality of nodes located on a ring in which a bandwidth of the ring is shared among channels between any of two nodes, a method of managing the bandwidth of a channel between a source node and a destination node, comprising steps of:
   computing a bandwidth allocation factor based on the size of a transit buffer of the source node; wherein the step of computing a bandwidth allocation factor is based on a recursive nonlinear function of the size of the transit buffer in accordance with the following equation:

$$C(k)=C(k-1)*f(Q(k), Q(k-1)),$$

$$BAF=C(k)-1,$$

where k is the iteration number, BAF is a bandwidth allocation factor, C(k) is a non-dimensional variable, and Q(k) is the transit buffer size at the measurement time k;
   collecting bandwidth allocation factors from nodes through which the channel transits;
   calculating a shaping rate using a minimum bandwidth allocation factor among bandwidth allocation factors thus collected, and
   controlling data flow through said channel at the source node by using the shaping rate while ensuring observance of a fair share of an available bandwidth by among more than one channel on the ring.

2. The method according to claim 1, wherein the shaping rate is defined as:

$$fm=rm+wm \times \min(BAFj),$$

where fm is the shaping rate for the channel, m, originating the source node, wm is the weight and rm is the minimum rate of channel, in, BAFj is the BAF for node, and min(BAFj) is the minimum BAF value for all nodes, j, which the channel transits.

3. The method according to claim 2, wherein f(Q(k), Q(k-1) takes a form of:

$$f(Q(k), Q(k-1)) = f(Q(k), T) = 1 - x \quad \text{if } Q(k) > T \text{ or}$$
   $$= 1 + x \quad \text{if } Q(k) <= T$$

where the parameter T is a configurable threshold, and x is a small real number in the range of [0,1].

4. The method according to claim 2, wherein f(Q(k), Q(k-1)) takes a form of:

$$f(Q(k), Q(k-1)) = f(Q(k), T1, T2) = 1 - x \quad \text{if } QD > T1$$
   $$= 1 \quad \text{if } T1 >= QD > T2$$
   $$= 1 + x \quad \text{if } QD <= T2$$

where T1 and T2 are configurable thresholds and x is a small real number in the range of [0,1].

5. The method according to claim 2, wherein C(k) is given by:

$$f(C(k), C(k1))=1 \kappa \Delta Q,$$

where $\Delta Q$ represents a difference term derived from an input data rate and an output data rate at the egress ot the source node and $\kappa$ is a constant.

6. The method according to claim 2, wherein C(k) is given by:

$$f(Q(k),Q(k-1))=1+\kappa 1 E-\kappa 2\Delta Q, \text{ where } E=(T-Q(k-1))$$

where κ1 and κ2 are constants, E represents an error term and T represents a target queue value.

7. The method according to claim 3, wherein the ring is of a dual ring configuration comprising a pair of counter-rotating ringlets, a channel between the source node and the destination occupying either of the two ringlets, each node comprising a transit buffer for each ringlet.

8. The method according to claim 4, wherein the ring is of a dual ring configuration comprising a pair of counter-rotating ringlets, a channel between the source node and the destination occupying either of the two ringlets, each node comprising a transit buffer for each ringlet.

9. The method according to claim 5, wherein the ring is of a dual ring configuration comprising a pair of counter-rotating ringlets, a channel between the source node and the destination occupying either of the two ringlets, each node comprising a transit buffer for each ringlet.

10. The method according to claim 6, wherein the ring is of a dual ring configuration comprising a pair of counter-rotating ringlets, a channel between the source node and the destination occupying either of the two ringlets, each node comprising a transit butter for each ringlet.

11. In a packet ring telecommunications network having a plurality of nodes located on a ring in which a bandwidth of the ring is shared among channels between any of two nodes, a system for managing the bandwidth of a channel between a source node and a destination node on the ring, comprising:

a transit buffer for queuing traffic to be transmitted out of the source node, the traffic being an aggregate of one or more channels;

means for monitoring size of the transit buffer at different measurement times;

means for generating a bandwidth allocation factor for said channel from the source node to the destination node by using the sizes of the transit buffer measured at the different times;

wherein the means for generating the bandwidth allocation factor contains algorithmic means for computing the bandwidth allocation factor on a recursive nonlinear function of the size of the transit buffer in accordance with the following equation:

$$C(k)=C(k-1)*f(Q(k),Q(k-1)),$$

$$BAF=C(k)-1,$$

where k is the iteration number, C(k) is a non-dimensional variable and Q(k) is the transit buffer size at the measurement time k;

means for collecting bandwidth allocation factors from other nodes through which said channel transits and for deriving a minimum bandwidth allocation factors among those factors thus collected;

a controller for generating a shaping factor for said channel based on the minimum bandwidth allocation factor, and a shaper for flow controlling traffic of said channel using the shaping factor.

12. The apparatus according to claim 11, wherein the controller generates shaping rate defined as:

$$fm=rm+wm\times\min(BAFj),$$

where fm is the shaping rate for the channel, m, originating the source node, wm is the weight and rm is the minimum rate of channel, m, BAFj is the BAF for node, j, and min(BAFj) is the minimum BAF value for all nodes, j, which the channel transits.

13. The apparatus according to claim 12, wherein f(Q(k), Q(k−1)) takes a form of:

$$f(Q(k), Q(k-1)) = f(Q(k), T) = 1 - x \quad \text{if } Q(k) > T \text{ or}$$
$$= 1 + x \quad \text{if } Q(k) <= T$$

where the parameter T is a configurable threshold, and x is a small real number in the range of [0,1].

14. The method according to claim 12, wherein f(Q(k), Q(k−1)) takes a form of:

$$f(Q(k), Q(k-1)) = f(Q(k), T1, T2) = 1 - x \quad \text{if } QD > T1$$
$$= 1 \quad \text{if } T1 >= QD > T2$$
$$= 1 + x \quad \text{if } QD <= T2$$

where T1 and T2 are configurable thresholds and x is a small-real number in the range of [0,1].

15. The method according to claim 12, wherein C(k) is given by:

$$f(C(k),C(k-1)=1+\kappa\Delta Q$$

where ΔQ represents a difference term derived from an input data rate and an output data rate at the egress of the source node and κ is a constant.

16. The method according to claim 12, wherein C(k) is given by:

$$f(Q(k),Q(k-1))=1+\kappa 1 E-\kappa 2\Delta Q, \text{ where } E=(T-Q(k-1))$$

where κ1 and κ2 are constants, E represents an error term and T represents a target queue value.

17. The system according to claim 13 wherein the ring comprises a pair of counter-rotating ringlets and a channel between the source node and the destination node occupies one of the two ringlets, comprising for each ringlet:

a transit buffer for queuing traffic to be transmitted out of the source node, the traffic being an aggregate of one or more channels in the ringlet;

means for monitoring size of the transit buffer at different measurement times;

means for generating a bandwidth allocation factor for said channel from the source node to the destination node through the ringlet by using the sizes of the transit buffer measured at the different times;

means for collecting bandwidth allocation factors from other nodes through which said channel transits and for deriving a minimum bandwidth allocation factors among those factors thus collected;

a controller for generating a shaping factor for said channel based on the minimum bandwidth allocation factor, and a shaper for flow controlling traffic of said channel using the shaping factor.

18. The system according to claim 14 wherein the ring comprises a pair of counter-rotating ringlets and a channel between the source node and the destination node occupies one of the two ringlets, comprising for each ringlet:

a transit buffer for queuing traffic to be transmitted out of the source node, the traffic being an aggregate of one or more channels in the ringlet;

means for monitoring size of the transit buffer at different measurement times;

means for generating a bandwidth allocation factor for said channel from the source node to the destination node through the ringlet by using the sizes of the transit buffer measured at the different times;

means for collecting bandwidth allocation factors from other nodes through which said channel transits and for deriving a minimum bandwidth allocation factors among those factors thus collected;

a controller for generating a shaping factor for said channel based on the minimum bandwidth allocation factor, and a shaper for flow controlling traffic of said channel using the shaping factor.

19. The system according to claim 15 wherein the ring comprises a pair of counter-rotating ringlets and a channel between the source node and the destination node occupies one of the two ringlets, comprising for each ringlet:

a transit buffer for queuing traffic to be transmitted out of the source node, the traffic being an aggregate of one or more channels in the ringlet;

means for monitoring size of the transit buffer at different measurement times;

means for generating a bandwidth allocation factor for said channel from the source node to the destination node through the ringlet by using the sizes of the transit buffer measured at the different times;

means for collecting bandwidth allocation factors from other nodes through which said channel transits and for deriving a minimum bandwidth allocation factors among those factors thus collected;

a controller for generating a shaping factor for said channel based on the minimum bandwidth allocation factor, and a shaper for flow controlling traffic of said channel using the shaping factor.

20. The system according to claim 16 wherein the ring comprises a pair of counter-rotating ringlets and a channel between the source node and the destination node occupies one of the two ringlets, comprising for each ringlet:

a transit buffer for queuing traffic to be transmitted out of the source node, the traffic being an aggregate of one or more channels in the ringlet;

means for monitoring size of the transit buffer at different measurement times;

means for generating a bandwidth allocation factor for said channel from the source node to the destination node through the ringlet by using the sizes of the transit buffer measured at the different times;

means for collecting bandwidth allocation factors from other nodes through which said channel transits and for deriving a minimum bandwidth allocation factors among those factors thus collected;

a controller for generating a shaping factor for said channel based on the minimum bandwidth allocation factor, and a shaper for flow controlling traffic of said channel using the shaping factor.

\* \* \* \* \*